(12) United States Patent
Brück et al.

(10) Patent No.: US 6,712,884 B2
(45) Date of Patent: Mar. 30, 2004

(54) PARTICLE TRAP AND PROCESS FOR SEPARATING PARTICLES OUT OF AN EXHAUST GAS FLOW AND HONEYCOMB BODY AND EXHAUST SYSTEM HAVING A PARTICLE TRAP

(75) Inventors: Rolf Brück, Bergisch-Gladbach (DE); Meike Reizig, Erpel (DE); Peter Treiber, Monheim (DE)

(73) Assignee: EMITEC Gesellschaft fuer Emisssionstechnologies GmbH, Lohmar (DE)

( * ) Notice: Subject to any disclaimer, the term of this patent is extended or adjusted under 35 U.S.C. 154(b) by 0 days.

(21) Appl. No.: 10/330,442

(22) Filed: Dec. 27, 2002

(65) Prior Publication Data

US 2003/0097934 A1 May 29, 2003

Related U.S. Application Data

(63) Continuation of application No. PCT/EP01/06529, filed on Jun. 8, 2001.

(30) Foreign Application Priority Data

Jun. 27, 2000 (DE) .......................... 100 31 200

(51) Int. Cl.$^7$ .......................... B01D 45/04; B01D 46/00
(52) U.S. Cl. ................. 95/268; 95/278; 95/20; 55/282.3; 55/307; 55/308; 55/320; 55/325; 55/385.3; 55/464; 55/523; 55/DIG. 10; 55/DIG. 30
(58) Field of Search .................. 55/282, 282.2, 55/282.3, 307, 308, 318, 320, 325, 329, 330, 331, 332, 337, 385.3, 463, 465, 523, 529, DIG. 10, DIG. 30; 95/268, 278, 19, 20; 60/274, 301, 303, 311

(56) References Cited

U.S. PATENT DOCUMENTS

| | | | | |
|---|---|---|---|---|
| 3,190,058 A | * | 6/1965 | Farr et al. ................. 55/325 |
| 3,957,133 A | * | 5/1976 | Johnson ................. 181/256 |
| 4,212,657 A | * | 7/1980 | Urbinati ................. 55/DIG. 30 |
| 4,437,867 A | * | 3/1984 | Lerner ................. 55/308 |
| 4,622,051 A | * | 11/1986 | Polach et al. ............ 55/DIG. 30 |
| 4,895,083 A | * | 1/1990 | McDilda ................. 55/308 |
| 5,097,665 A | * | 3/1992 | Kammel ................. 55/DIG. 30 |
| 5,606,854 A | * | 3/1997 | Hoffmann ................. 60/274 |
| 6,068,674 A | * | 5/2000 | Dullien et al. ................. 55/308 |
| 6,427,436 B1 | * | 8/2002 | Allansson et al. ............ 60/274 |
| 6,468,320 B1 | * | 10/2002 | Sumitani et al. ............ 55/320 |
| 6,474,060 B2 | * | 11/2002 | Khair ................. 60/311 |

FOREIGN PATENT DOCUMENTS

| | | | |
|---|---|---|---|
| DE | 35 02 448 A1 | 7/1986 | |
| EP | 0 839 566 A1 | * 5/1998 | ........ B01D/45/02 |
| WO | WO 93/20339 | 10/1993 | |

* cited by examiner

Primary Examiner—Duane Smith
Assistant Examiner—Jason M. Greene
(74) Attorney, Agent, or Firm—Laurence A. Greenberg; Werner H. Stemer; Ralph E. Locher

(57) ABSTRACT

A particle trap, such as in a honeycomb body, for separating particles out of an exhaust gas flow, includes a flow channel. An exhaust gas flow which includes particles flows through the flow channel. Internals, such as projections, humps, protuberances or the like are situated on one side of the flow channel. An opposite region of a channel wall is completely or partially porous. When a flow of exhaust gas which includes particles flows through the particle trap, the particles are diverted toward the porous channel wall, to which they adhere. They can then be removed again by regeneration. The particle trap and an associated process for separating particles out of an exhaust gas flow, are particularly advantageous when used in the exhaust system of an internal-combustion engine, in particular a diesel engine, specifically and advantageously in combination with a soot filter.

31 Claims, 3 Drawing Sheets

PARTICLE TRAP AND PROCESS FOR SEPARATING PARTICLES OUT OF AN EXHAUST GAS FLOW AND HONEYCOMB BODY AND EXHAUST SYSTEM HAVING A PARTICLE TRAP

CROSS-REFERENCE TO RELATED APPLICATION

This application is a continuation of copending International Application No. PCT/EP01/06529, filed Jun. 8, 2001, which designated the United States and was not published in English.

BACKGROUND OF THE INVENTION

Field of the Invention

The invention relates to a particle trap for separating particles out of a fluid or exhaust gas flow, having at least one flow channel through which the fluid flows. The invention also relates to a process for separating particles out of a fluid or exhaust gas flow. Additionally, the invention relates to a honeycomb body and an exhaust system having a particle trap.

A particle trap of the type described above is used to separate solid particles which are contained in a flowing fluid out of the flow. Particle traps of that type have particular practical significance when cleaning diesel exhaust gases from vehicles. In that case, it must be possible to regenerate the particle trap by oxidizing the particles. It should be possible to fit the trap in a pipe, such as for example in an exhaust system of a motor vehicle.

Particles in the exhaust gases of a motor vehicle often accumulate on a coating and/or an outer wall, such as for example in the exhaust system and/or in a catalytic converter of the motor vehicle. In the event of load changes, they are then expelled in the form of a cloud of particles, such as for example a cloud of soot.

In order to separate out the particles, it is customary to use screens, which are in some cases also referred to as filters. Although screens are fundamentally able to trap the particles, they have two significant drawbacks: firstly, they may become blocked, and secondly they cause an undesired pressure drop. If screens are not used, there is a risk that the honeycomb body of the catalytic converter will become blocked, i.e. the pores of the precious metals will become covered, and it will be impossible for either pollutants or oxygen to diffuse to the precious metals at the locations which have been covered by the particles. Moreover, it is necessary to observe statutory values for motor vehicle emissions, which would be exceeded without a reduction in the level of particles. It is therefore necessary to provide elements for trapping exhaust-gas particles which avoid the drawbacks of the screens and filters and do not impair the activity of the catalytic converters.

SUMMARY OF THE INVENTION

It is accordingly an object of the invention to provide a particle trap and a process for separating particles out of an exhaust gas flow and a honeycomb body and an exhaust system having a particle trap, which overcome the hereinafore-mentioned disadvantages of the heretofore-known devices and methods of this general type and which separate particles out of an exhaust gas flow with the highest possible efficiency, while the particles that have been separated out can also subsequently be removed by oxidation, so that the particle trap can be regenerated.

With the foregoing and other objects in view there is provided, in accordance with the invention, a particle trap for separating particles out of an exhaust gas flow. The particle trap comprises at least one flow channel through which an exhaust gas flows. The flow channel has at least one wall with regions. At least the regions are made from porous or highly porous material. The flow channel also has internals acting as a diverting or guiding structure for diverting the particles out of the exhaust gas flow to the regions made from porous or highly porous material.

With the objects of the invention in view, there is also provided a process for separating particles out of an exhaust gas flow, which comprises providing a particle trap with at least one flow channel having a porous or highly porous channel wall, and providing at least one diverting or guiding structure in the at least one flow channel. Particles of an exhaust gas flowing through the particle trap are thrown or diverted onto the porous channel wall by the at least one diverting or guiding structure.

The above-described structure and mode of operation of the invention are advantageous because it has surprisingly been seen that the particles which are diverted out of the flow or exhaust gas toward the regions made from porous or highly porous material by the internals remain attached to the porous channel wall as a result of interception and/or impaction. The pressure differences in the flow profile of the flowing fluid are of importance in bringing about this effect. The deflections allow additional local reduced pressure and increased pressure conditions to be established, which lead to a filtration effect through the porous wall, since the pressure differences have to be compensated for.

In contrast to closed screen or filter systems, the particle trap is open, since there are no blind flow alleys. These properties can also serve in this case to characterize the particle trap, for example by saying that an open view of 20% means that, when viewed in cross section, it is possible to see through approximately 20% of the area. This would correspond to an area of >0.1 mm$^2$ for a 600 cpsi carrier with d (hydraulic)=0.8 mm.

Suitable materials for the particle trap are metal, plastic, ceramic, etc., at least for that part of the channel wall which lies approximately opposite the internals that are porous when constructing the flow channels.

The porous material being used may be any porous or highly porous sintered and/or fibrous substance. In addition to the deposition and adhesion behavior with respect to soot particles (for example large geometric surface area, large inflow area, suitable depth of the structure), the dimensional stability, strength and resistance to corrosion of the porous or highly porous material also play a role.

The particle trap according to the invention and the process according to the invention are particularly significant when used on honeycomb bodies which are known from catalytic converters of motor vehicles. In this case, a porous channel wall is produced, for example, by forming the entire honeycomb body from porous material. When forming the honeycomb body from porous or highly porous material, the extent to which fluid can flow through the porous material is of interest to the extent that it is possible to achieve a radial flow through the particle trap through the use of completely porous channel walls.

The channel wall is considered to be the channel wall over the entire length of the flow channel or a part of the entire channel wall.

Through the use of the diverting or guiding structure, that is to say the internals, particles are deflected out of the fluid, at certain velocities, onto the porous wall, to which they adhere. In the particle trap, the particles are separated out on the basis of the "striker" and "catcher" principle. The diverting structure, as the "striker", diverts the particles toward the "catcher" of the porous channel wall or interlayer. The diverting structures within a flow channel may be identical or different, and the structuring of the flow channels within a particle trap may also vary.

The cross section of the flow channel is dimensioned in such a way that even the smallest point in the channel allows particles of an average size to pass through. The cross section is influenced by the diverting or guiding structures and may be identical or different over the length of the flow channel.

In accordance with another feature of the invention, the region made from porous or highly porous material is formed by an interlayer which is disposed on the nonporous channel wall. This provides a greater freedom of choice in terms of the materials being used.

In accordance with a further feature of the invention, the internals include at least one projection, hump, protuberance or the like, which is disposed so as to project out of the channel wall opposite the region made from porous or highly porous material and, if appropriate, in an axially offset manner. In this way, the internals can be produced easily in terms of manufacturing technology and at optimum locations.

In accordance with an added feature of the invention, a plurality of projections, humps, protuberances or the like are disposed in succession, and all project equally far from the channel wall into the interior of the flow channel, as seen in the flow direction of the fluid. Alternatively, a plurality of projections, humps, protuberances or the like are disposed in succession, projecting progressively further from the channel wall into the interior of the flow channel as seen in the flow direction. In both of these cases, it is also possible, according to an advantageous configuration, to provide a grouped configuration of the projections, humps, protuberances or the like, with regions also extending in the peripheral direction of the channel wall.

A suitable adaptation of the diverting and guiding structures and the structuring of the flow channels makes it possible, for example, to achieve a particular effect. According to that effect, within a particle trap, in successive partial regions, first of all the particles which are diverted by the structures with a first flow velocity are deflected onto the porous channel wall, and then the particles with a second, for example higher particle velocity, which have not been diverted, are diverted on the smaller diverting structures, etc. In this case, the particle trap offers a separating feature for any flow velocity, depending on the operating state of a vehicle.

It is also possible, through the use of the geometry of the diverting and guiding structures, for the flow velocity and the flow pressure of the fluid flowing through the particle trap to be manipulated and adapted to an optimum separation rate. In this way, by way of example, the increasing radial extent of the projections, humps, protuberances or the like into the interior of the flow channel ensures that not only are the particles which are at a higher velocity diverted, but also those particles which lie close to the porous channel wall are diverted. In this way, the diffusion distance which a particle has to cover through the flow to the wall region made from porous or highly porous material becomes ever shorter.

In accordance with an additional feature of the invention, the internals acting as a diverting or guiding structure each deflect between 2% and 15%, in particular between 4% and 8%, of the particles still contained in the exhaust gas toward the regions made from porous or highly porous material, which has proven particularly advantageous. Corresponding tests have shown that a particle trap constructed in this way causes only a very low pressure drop, while with a sufficient number of diverting or guiding structures disposed offset with respect to one another and/or one behind the other in the flow direction, very effective removal of particles is nevertheless ensured. If appropriate, it is also possible in this case for a plurality of particle traps of this type, each having a few diverting or guiding structures, to be connected in series. If appropriate, they are supported with respect to one another. The number of the diverting or guiding structures is to be selected in particular in such a way that at least a statistical diversion of the entire gas stream toward or through the porous material is effected. It is currently known from tests that if even 10 to 15 diverting structures of this type are connected one behind the other in the flow direction, a separation efficiency of over 90% and even over 95% of the particles contained in the flow is achieved.

In accordance with yet another feature of the invention, the diversion of the particles still contained in the exhaust gas is effected by suitably selecting the porosity of the porous or highly porous material and/or the size of the diverting or guiding structure of the particle trap. This means, for example, that a lower degree of diversion of the flow, with smaller diverting structures, is required if a sufficiently high porosity of the channel wall is ensured. In this case, in particular, regions with reduced pressures in adjoining flow paths are produced close to and downstream of a diverting structure, as seen in the flow direction, so that the particles are sucked into the porous material. If the particle trap is suitably adapted to the prevailing flow conditions of the exhaust gas flowing in, particularly effective separation of particles in combination with very low pressure losses is ensured.

With the objects of the invention in view, and in accordance with a practical implementation, the particle trap forms part of a honeycomb body with a multiplicity of flow channels. In this embodiment, the particle trap is particularly suitable for automotive engineering. In order to cover various (dynamic) load changes of the drive system of a motor vehicle, a conical system or an element in cone form is preferred. Such systems as described, for example, in International Publication No. WO 93/20339, have widening channels, so that particularly favorable conditions for trapping particles are established for any mass throughput at some point in the channels, if they are provided with appropriate diverting or turbulence-imparting structures.

In accordance with another mode of the invention, the separation of particles out of a fluid flow is perfected by regenerating the porous or highly porous channel wall continuously or discontinuously. In this case, various auxiliaries can be added in combination or individually. Auxiliaries are, on one hand, upstream catalytic converters which provide sufficient $NO_2$ and/or upstream additions of additives which promote oxidation of the particles and therefore regeneration of the particle trap.

In addition, it is also possible for a $NO_2$ accumulator to be flow-connected to the particle trap, for example an accumulator made from perovskite, such as $BaSnO_3$ or another barium-tin perovskite, or a $NO_2$ accumulator made from barium aluminate and/or an accumulator made from a barium zeolite.

In accordance with a further mode of the invention, the process is assisted by auxiliaries which are released as a function of the degree of occupation of the particle trap. This process can therefore be initiated in accordance with a pressure drop which is determined by the particle trap.

With the objects of the invention in view, there is additionally provided an exhaust system of an internal-combustion engine, in particular a diesel engine, in which the particle trap according to the invention is particularly advantageously used. It is especially advantageous for the particle trap to be used in combination with a soot filter. In this case, the soot filter will, of course, be considerably smaller than in exhaust systems without a particle trap.

Other features which are considered as characteristic for the invention are set forth in the appended claims.

Although the invention is illustrated and described herein as embodied in a particle trap and a process for separating particles out of an exhaust gas flow and a honeycomb body and an exhaust system having a particle trap, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
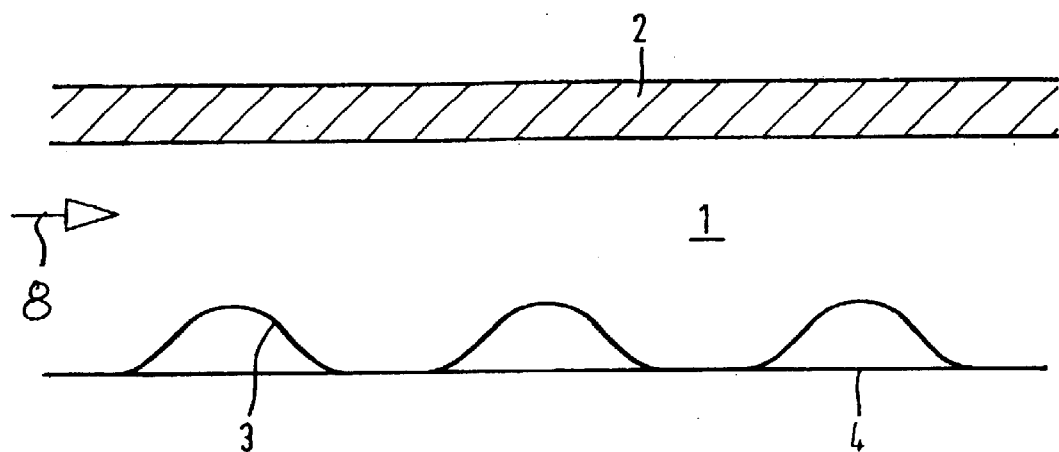
FIG. 1 is a fragmentary, diagrammatic, sectional view of a particle trap, which illustrates a basic function of the particle trap according to the invention and of the process according to the invention.

Referring now to the figures of the drawings in detail and first, particularly, to FIG. 1 thereof, there is seen a flow channel 1 in which a particle-laden fluid flows in a flow direction 8 (as indicated by an arrow). In this case, a channel wall 2 is completely porous. Opposite the channel wall 2 are internals, in the form of projections, humps or protuberances 3. A channel wall 4 is nonporous at this location. At a low flow velocity, the particles of the fluid are caught by the projections, humps or protuberances 3 and are diverted toward the porous channel wall 2, where they adhere. During regeneration of the particle trap, they can be removed, for example by oxidation using oxygen at high temperature or by oxidation using nitrogen dioxide at lower temperatures.

Figure 2:
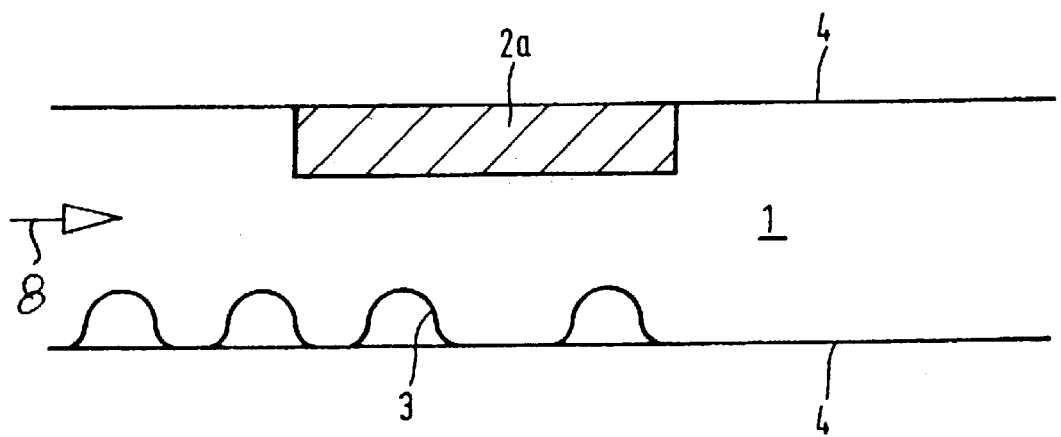
FIG. 2 is a fragmentary, sectional view of the particle trap according to the invention in which a region made from porous or highly porous material is formed by an interlayer.

FIG. 2 likewise shows a flow channel 1, in which the particle-laden fluid flows in a flow direction 8 (indicated by an arrow). In this case, a channel wall 4 is completely nonporous. However, there is an interlayer 2a of porous material. Projections, humps or protuberances 3 or the like are disposed opposite and slightly offset with respect to this interlayer 2a, so that in this case, too, the particles from the fluid are diverted onto the porous interlayer 2a, where they adhere.

Figure 3:
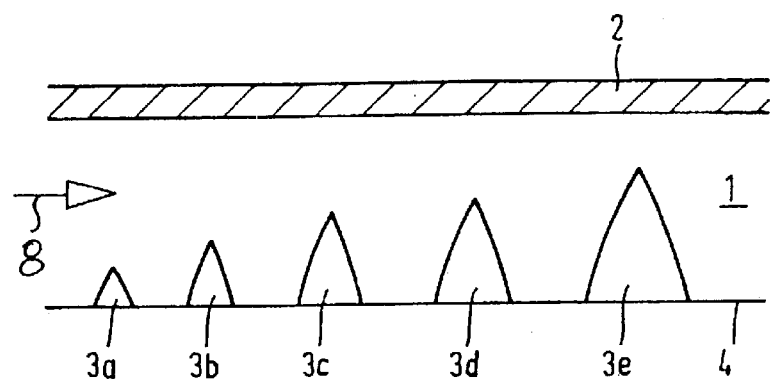
FIG. 3 is a fragmentary, sectional view of a particle trap with internals which, as seen in a flow direction, project progressively further from a channel wall into an interior of the flow channel.

FIG. 3 shows fundamentally the same configuration as FIG. 1, except that in this case projections, humps or protuberances 3a, 3b, 3c, 3d, 3e which are disposed one behind the other in the flow direction 8 are constructed in such a way that their radial extent into the flow cross section becomes increasingly greater. In this way, the particles are diverted even at higher velocities, and there is an increasingly shorter distance between them and the wall region which is of porous or highly porous structure. Therefore, the distances to the adhesion region for the particles also become increasingly shorter.

Figure 4:
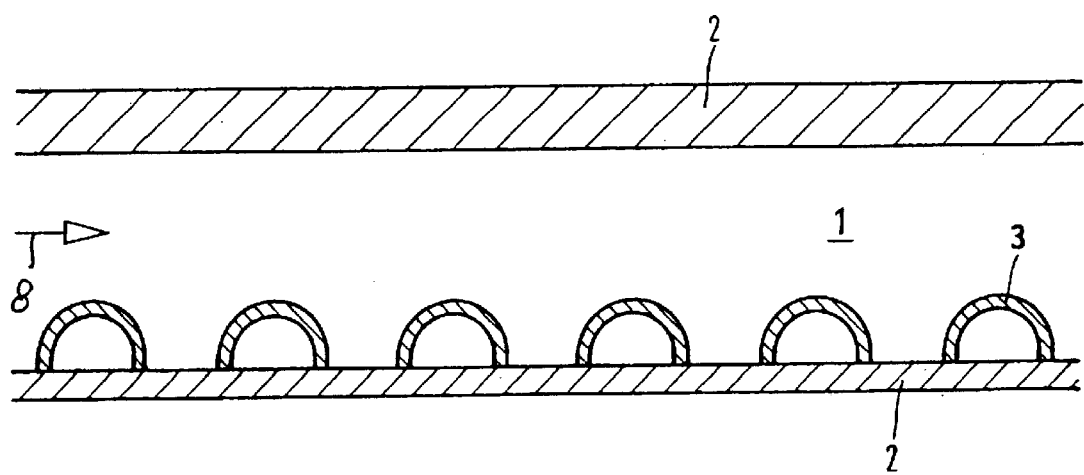
FIG. 4 is a fragmentary, sectional view of a particle trap with internals disposed one behind the other and all extending the same distance into the interior of the flow channel.

In the case of FIG. 4, the entire part of the flow channel 1 which is illustrated is formed of porous or highly porous material, i.e. this applies to both projections, humps or protuberances 3 and to two channel walls 2. In this case, the radial extent of the projections, humps or protuberances and the like is constant. It is possible, although not necessary, for the same porous material to be used throughout.

Figure 5:
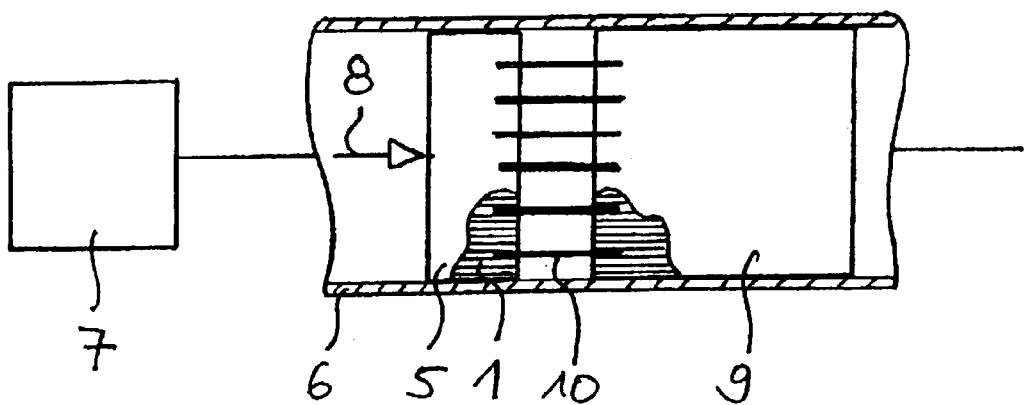
FIG. 5 is a fragmentary, sectional view of an embodiment of the particle trap which is supported against a downstream catalyst carrier body.

FIG. 5 diagrammatically depicts a configuration of an embodiment of a particle trap 5 in an exhaust system 6 of an internal-combustion engine 7. In this case, the particle trap 5 is supported directly against a catalyst carrier body or honeycomb body 9 which is disposed downstream, as seen in a flow direction 8. For this purpose, the particle trap 5 is held through the use of securing pins 10 which are disposed in flow channels 1 and preferably uniformly over the cross section of the catalyst carrier body 9 and the particle trap 5. In this context, the term internal-combustion engine 7 is understood as meaning, in particular, engines of passenger automobiles and/or motorcycles which are operated with diesel fuel, in addition to spark-ignition engines. The securing pins 10 are constructed in such a way that they have approximately the same cross section as the flow channels 1 and extend at least partially into these channels. In this case, the catalyst carrier body 9 may also be replaced by a different component for cleaning the exhaust gas, such as for example a soot filter.

We claim:

1. A honeycomb body, comprising:
   a particle trap for separating particles out of an exhaust gas flow;
   said particle trap having a multiplicity of flow channels through which the exhaust gas flows;
   each of said flow channels having at least one wall with regions, at least said regions being made from porous material; and
   each of said flow channels having internals acting as a guiding structure for diverting the particles out of the exhaust gas flow to said regions made from porous material.

2. The honeycomb body according to claim 1, wherein said particle trap is for separating particles out of the exhaust gas of a motor vehicle.

3. The honeycomb body according to claim 1, wherein said regions made from porous material are made from highly porous material.

4. The honeycomb body according to claim 1, wherein said at least one wall includes a nonporous wall, and said regions made from porous material are formed by an interlayer disposed on said nonporous wall.

5. The honeycomb body according to claim 1, wherein said internals include at least one element selected from the group consisting of a projection, a hump and a protuberance projecting out of said at least one wall opposite said regions made from porous material.

6. The honeycomb body according to claim 5, wherein said at least one element is axially offset from said regions made from porous material.

7. The honeycomb body according to claim 4, wherein said internals include at least one element selected from the group consisting of a projection, a hump and a protuberance projecting out of said at least one wall opposite said regions made from porous material.

8. The honeycomb body according to claim 7, wherein said at least one element is axially offset from said regions made from porous material.

9. The honeycomb body according to claim 5, wherein said at least one element includes a plurality of elements, said plurality of elements selected from the group consisting of projections, humps and protuberances are disposed in succession and project equally from said at least one wall into an interior of said flow channel, as seen in an exhaust gas flow direction.

10. The honeycomb body according to claim 7, wherein said at least one element includes a plurality of elements, said plurality of elements selected from the group consisting of projections, humps and protuberances are disposed in succession and project equally from said at least one wall into an interior of said flow channel, as seen in an exhaust gas flow direction.

11. The honeycomb body according to claim 5, wherein said at least one element includes a plurality of elements, said plurality of elements selected from the group consisting of projections, humps and protuberances are disposed one behind the other and project progressively further from said channel wall into an interior of said flow channel, as seen in an exhaust gas flow direction.

12. The honeycomb body according to claim 7, wherein said at least one element includes a plurality of elements, said plurality of elements selected from the group consisting of projections, humps and protuberances are disposed one behind the other and project progressively further from said channel wall into an interior of said flow channel, as seen in an exhaust gas flow direction.

13. The honeycomb body according to claim 5, wherein said at least one element includes a plurality of elements, said plurality of elements selected from the group consisting of projections, humps and protuberances are in a grouped configuration with regions extending in peripheral direction of said at least one wall.

14. The honeycomb body according to claim 7, wherein said at least one element includes a plurality of elements, said plurality of elements selected from the group consisting of projections, humps and protuberances are in a grouped configuration with regions extending in peripheral direction of said at least one wall.

15. The honeycomb body according to claim 1, wherein at least one of said multiplicity of flow channels and said internals are formed of porous material.

16. The honeycomb body according to claim 1, wherein said internals each deflect between 2% and 15% of the particles still contained in the exhaust gas toward said regions made from porous material.

17. The honeycomb body according to claim 1, wherein said internals each deflect between 4% and 8% of the particles still contained in the exhaust gas toward said regions made from porous material.

18. The honeycomb body according to claim 1, wherein said porous material has a porosity suitable for diverting the particles still contained in the exhaust gas.

19. The honeycomb body according to claim 1, wherein said guiding structure has a size suitable for diverting the particles still contained in the exhaust gas.

20. A process for separating particles out of an exhaust gas of a motor vehicle, which comprises:

providing a particle trap with a multiplicity of flow channels each having a porous channel wall;

providing at least one diverting or guiding structure in each of the multiplicity of flow channels; and throwing or diverting particles out of the exhaust gas flowing through the particle trap onto the porous channel wall with the at least one diverting or guiding structure.

21. The process according to claim 20, wherein the porous channel wall is a highly porous channel wall.

22. The process according to claim 20, which further comprises diverting the particles onto the porous channel wall as a function of a flow velocity in various partial regions of the particle trap.

23. The process according to claim 20, which further comprises continuously regenerating the porous channel wall.

24. The process according to claim 20, which further comprises discontinuously regenerating the porous channel wall.

25. The process according to claim 23, which further comprises assisting the regenerating step with auxiliaries released as a function of a degree of occupation of the particle trap.

26. The process according to claim 24, which further comprises assisting the regenerating step with auxiliaries released as a function of a degree of occupation of the particle trap.

27. The process according to claim 20, which further comprises diverting between 2% and 15% of the particles still contained in the exhaust gas toward regions of the channel wall made of porous material, with the at least one diverting or guiding structure.

28. The process according to claim 20, which further comprises diverting between 4% and 8% of the particles still contained in the exhaust gas toward regions of the channel wall made of porous material, with the at least one diverting or guiding structure.

29. An exhaust system of an internal-combustion engine, comprising:

a particle trap for separating particles out of an exhaust gas flow;

said particle trap having a multiplicity of flow channels through which the exhaust gas flows;

each of said flow channels having at least one wall with regions, at least said regions being made from porous material; and each of said flow channels having internals acting as a guiding structure for diverting the particles out of the exhaust gas flow to said regions made from porous material.

30. The exhaust system according to claim 29, including a soot filter.

31. An exhaust system of a diesel engine, comprising:

a particle trap for separating particles out of a diesel exhaust gas flow;

said particle trap having a multiplicity of flow channels through which the diesel exhaust gas flows;

each of said flow channels having at least one wall with regions, at least said regions being made from porous material; and each of said flow channels having internals acting as a guiding structure for diverting the particles out of the diesel exhaust gas flow to said regions made from porous material.

* * * * *